United States Patent
Thiemann et al.

[15] 3,676,490

[45] July 11, 1972

[54] NEW ANTIBIOTIC

[72] Inventors: Josef Thiemann; Yelahanka K. S. Murthy, both of Como; Carolina Coronelli, Milan, all of Italy

[73] Assignee: Lepetit S.p.A., Milan, Italy

[22] Filed: July 9, 1965

[21] Appl. No.: 470,884

[30] Foreign Application Priority Data

July 29, 1964 Great Britain.......................30,116/64

[52] U.S. Cl.................................................260/534, 195/80
[51] Int. Cl. ..................................C07c 101/30, A61k 21/00
[58] Field of Search ......................167/65 AB, 3 A; 260/534; 195/80

Primary Examiner—Stanley J. Friedman
Attorney—Joseph Hirschmann

[57] ABSTRACT

The invention is concerned with a new antibiotic, named alanosine, whose chemical structure corresponds to L-(-)-2-amino-3-nitrosohydroxylamino-propionic acid. It is obtained by cultivating a new species of Actinomyces of the genus Streptomyces, designated Streptomyces alanosinicus n.sp. ATCC 15710.

6 Claims, No Drawings

NEW ANTIBIOTIC

This invention is concerned with a new antibiotic. More particularly, this invention provides a new antibiotic substance referred to hereinafter as alanosine, and salts thereof. Further subjects of the invention are pharmaceutical compositions containing the antibiotic alanosine, and a process for the manufacture of the same.

Alanosine is a white crystalline substance, sparingly soluble in water, not soluble in the usual organic solvents, soluble in acids at pH under about 3.5, and soluble in alkalies at pH over 7.0. It can be crystallized from water.

The empirical formula of alanosine is $C_3H_7N_3O_4$, m.w. 149.1. The elemental analysis gave the following values: calcd. C 24.18, H 4.70, N 28.15, O 42.92; found C 24.07, H 4.86, N 28.15, O 42.92 (by difference). The structural formula, which is unique for an antibiotic substance, is as follows

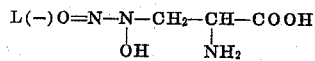

i.e. L (-)-2-amino-3-nitrosohydroxylaminopropionic acid.

Alanosine melts at 190° C. It is optically active, having the specific rotation $[\alpha]_D^{25} = -37.8°$ ($c = 0.5$, water). It exhibits in the ultraviolet light a maximum at 250 m$\mu$, $E_1^{1\%}{}_{cm}$ 630, in phosphate buffer pH 7.0; in 0.1 hydrochloric acid the maximum is shifted to 228 m$\mu$, $E_1^{1\%}{}_{cm}$ 504. The pK value of the chromophoric group as calculated spectrophotometrically is 4.8.

In the infrared spectrum, taken up in nujol, alanosine shows the following main bands, expressed in cm$^{-1}$: 3160, 2925 (nujol), 2850 (nujol), 2720, 2630, 2500, 2000, 1870, 1650, 1594, 1500, 1465, 1433 (nujol), 1394, 1380 (nujol), 1340, 1277, 1237, 1160, 1087, 1070, 980, 967, 915, 860, 814, 734, 663.

The potentiometric titration curve obtained with sodium hydroxide shows two shoulders with pK 4.7 and pK 8.6 and equivalent weights 152 and 162 respectively. A titration carried out with NaOH after addition of formaldehyde shows a single shoulder with pK 4.7 and e.w. 75.

With ninhydrin, alanosine gives a violet coloration; by gentle heating with sulfanilic acid and $\alpha$-naphthylamine it gives an intense red-violet coloration, indicative of the presence of a nitroso group.

Alanosine gives salts with alkali and alkaline earth metals and generally with inorganic and organic basic substances. Having two different acid groups, it can form both neutral and acid salts.

Alanosine possesses an antimycotic activity against various test organisms. The following table gives the minimal inhibitory concentration in $\gamma$/ml. against some representative strains.

| | |
|---|---|
| Candida albicans ATCC 10231 | 10 |
| Candida albicans SKF 2270 | 5 |
| Saccharomyces cerevisiae ATCC 9736 | 2 |
| Entamoeba histolytica | 50 |
| Trichomonas vaginalis | 50 |
| Penicillium sp. | >100 |

The effect of alanosine on sarcoma from virus SV-40 was tested. To this purpose twelve hamsters were employed for transplantation with tumor tissue. Twenty four hours after transplantation treatment with alanosine was started by subcutaneous administration of 20 mg/kg of alanosine once a day to eight of the animals and lasted 21 days after the first appearance of a tumor in control animals. The four animals serving as controls received 1 ml. of physiologic saline per diem subcutaneously, and developed a palpable tumor after 15 days of incubation. At the end of the experiment no tumor growth was observed in the treated animals, while in the controls the tumors were anywhere from one third to one half the size of the host animal.

In another experiment, hamsters with well developed tumors were employed to examine the influence of alanosine on the tumor reductability. Thus 12 animals having tumors were measured for their tumor size and an approximate diagramatic representation of each tumor was maintained. Four animals were treated with 2 ml. of saline per diem subcutaneously. Eight other animals were treated with 30 mg./Kg. of alanosine per diem subcutaneously. Treatment lasted for two weeks, during which period a regular check on the size and shape of the tumor was made. It was noted that in the treated animals, by about the tenth day of administration, the decrease was anywhere from 50 percent to a size which was not big enough to measure properly. Even among those animals having a perceptable tumor, the consistency of the tumor tissue was very much different from the control animals. The "treated tumors" were soft whereas the control ones were very hard. A repetition of the above experiment confirmed the observations.

The antibiotic shows a very low toxicity. The $LD_{50}$ in mice is 600 mg/kg intraperitoneally and 300 mg/kg intravenously.

Alanosine is obtained by the culture of a new species of Actinomyces of the genus Streptomyces, which was originally defined as Streptomyces sp. V/119, and subsequently named Streptomyces alanosinicus n. sp.. This microorganism was isolated from a soil sample from Brazil and was filed with the American Type Culture Collection under the code number ATCC 15710. The characteristics of the microorganism, which is different from any known species of the genus Streptomyces, are given in the following description.

In order to investigate the growth characteristics of Streptomyces alanosinicus n. sp. the culture was grown on a variety of standard media, incubated at 28° C for two weeks prior final examinations were made.

On Benett's agar, the microorganism forms colonies usually 3 to 5 mm. in diameter, with well defined contours, compact, raised center and velvety surface; covered with whitish gray aerial mycelium, later becoming light brown when fully sporulated. A great number of colonies plated on agar do not form aerial mycelium, developing only vegetative mycelium brown to dark brown in color. In Table 1 are reported the physiological and cultural characteristics of Streptomyces alanosinicus n.sp.. Optimum temperature for development of the colonies is at 28°–37° C; no growth occurs at 50° C and only very little at 22° C.

When sporulation takes place, the spores appear in monopodially branched sporophores with tightly coiled spirals bearing ellipsoidal spores (1 × 1.3 u). According to the classification of Pridham, Hesseltine and Benedict Streptomyces alanosinious n.sp. would thus be included in the "gray series" of section "spira".

TABLE 1
Physiological and cultural characteristics of *Streptomyces alanosinicus* n.sp. ATCC 15710

| Culture media | Vegetative mycelium | Aerial mycelium | Soluble pigment | Biochemical characteristics |
|---|---|---|---|---|
| Oatmeal | Good growth, light brown | Moderate, cottony white, to brownish white to brownish gray. | Brown | |
| Emerson | Good growth, amber | Scant, powdery white gray | Amber to brown. | |
| Sabouraud | Good growth slightly wrinkled, amber to dark brown. | Moderate, powdery white to mouse gray. | Reddish brown to dark brown. | |
| Benett | Scant growth, brown | Moderate to good cottony white to gray. | Amber to brown. | |
| Peptone iron-agar | Moderate growth, brown | None | Black | $H_2S$ production. |
| Czapeck Dox | Good growth, hyaline | Scant, white | None | |
| Potato agar | Scant growth hyaline | Trace of white cottony mycelium. | do | |
| Potato plug | Good growth | None | Black | |
| Glucose-asparagine | Good growth, hyaline | Moderate, cottony white | Rose brown to brown | |
| Glycerine-asparagine | Good growth, dark brown | Good, cottony white to white gray. | Rose brown to dark brown | |
| Nutrient agar | Scant growth, hyaline | None | Traces of light amber | |
| Carrot plug | Good growth, hyaline | do | None | |
| Starch agar | Scant growth, hyaline | Good, cottony white becoming light brown. | do | Good hydrolysis. |
| Gelatine stab | | | Trace of brown pigment | Complete hydrolysis. |
| Nitrates broth | | | None | Reduction negative. |
| Litmus milk | | | | No coagulation, complete peptonization, no pH change. |
| Calcium malate agar | No growth | | | |
| Tyrosine agar | Scant growth, light brown | None | None | Melanine negative. |
| Hyckey and Tresner agar | Good growth, dark brown | Good, cottony white to gray. | Dark brown | |
| Cellulose nutrient agar | Good growth, light brown | Good, cottony whitish | Light brown | No visible cellulose digestion. |
| Skim milk agar | Good growth, brown | None | Reddish-brown | Slight hydrolysis of casein. |

Natural and induced mutants having a dark-brown to black vegetative mycelium and being devoid of aerial mycelium were obtained. These mutants produced alanosine in good yields.

Strept. alanosinicus n.sp. was compared to a number of already described streptomyces with similar characters: Streptomyces platensis, Str. parvulus, Str. filipinensis, and Str. albogriseolus. Some distinct differences are found, however, in cultural characteristics as well as in biochemical properties among these species and our isolate Str. alanosinicus. Some differences are listed below:

Str. platensis. The color of aerial mycelium on glucose asparagine agar is reported to be white becoming almost black. Formation of greenish-yellow pigment on Calcium-malate agar; nitrates reduced; inulin not utilized, and sorbitol and dulcitol metabolized.

Str. parvulus. Yellow soluble pigment produced on glucose-asparagine agar, nutrient agar, and gelatin. $H_2S$ negative. Produces actinomycin D.

Str. filipinensis. This species produces yellow pigment on glycerol-asparagine agar; gelatin is very slowly hydrolyzed. Reported to form filipin a polyene antifungal antibiotic.

Str. albogriseolus. Nitrate is reduced to nitrite; $H_2S$ is formed; growth on potato dirtygrayish-white to faint pink, aerial mycelium and spores formed on nutrient agar, but no pigments. This species is reported to produce a "neomycin complex".

Streptomyces alanosinicus n. sp. when grown by the technique of T.G. Pridham and D. Gottlieb, J. Bacteriology 56, 107 (1948) with the use of various sources of carbon, utilized practically all compounds tested except rhamnose, sorbitol, dulcitol and sorbose. This appears from the following table 2.

TABLE 2

Utilization of carbon sources.

| Carbon source | Growth | Sporification |
|---|---|---|
| Arabinose | ++ | + |
| Xylose | + | − |
| Glucose | + | + |
| Galactose | ++ | + |
| Fructose | ++ | + |
| Mannose | ++ | + |
| Rhamnose | − | − |
| Lactose | ++ | − |
| Maltose | ++ | + |
| Sucrose | ++ | + |
| Raffinose | ++ | + |
| Glycerol | ++ | + |
| Sorbitol | − | − |
| Mannitol | ++ | + |
| Dulcitol | − | − |
| Inositol | ++ | + |
| Dextrin | + | − |
| Inulin | ++ | + |
| Starch | + | − |
| Ribose | ++ | + |
| Sorbose | − | − |

++ good; + moderate; − none.

To produce alanosine, a strain of Streptomyces alanosinicus n. sp. or a natural or induced mutant thereof having similar characteristics is aerobically cultivated in a nutrient aqueous medium containing an assimilable carbon source, such as carbohydrates, an assimilable nitrogen source, such a meat extract, peptone, corn steep liquor and so on, and inorganic salts, such as chlorides, nitrates, carbonates, sulfates, of alkali metal or alkaline earth metals, zinc, manganese, iron, magnesium, until the solution shows a substantial antimycotic and antiviral activity, and the formed antibiotic is isolated from the culture filtrate.

As stated above, the fermentation is carried out aerobically, preferably under shaking or stirring, at a temperature within the range 20°–40° C for 72 hours to five days and more. A substantial antimycotic and antiviral activity in the nutrient is generally present after one to three days.

The isolation of the antibiotic from the culture filtrate, after separation of the mycelium, may be carried out by several ways. For instance, the clear filtrate may be poured into a solvent miscible with water in which the antibiotic is not soluble. The precipitated antibiotic is then collected and purified. Alternatively, chromatographic procedures commonly used for the isolation of antibiotic substances may be employed. A purification may also be effected through the intermediate formation of the water soluble alkali and alkaline earth metal salts and reprecipitation by adjusting the pH between about 3.5 and 7.0.

The following examples give indications about the production, isolation and purification of alanosine. The examples, however, are not to be intended as limitative of the scope of the invention.

EXAMPLE 1.

Shake flask fermentation of Streptomyces alanosinicus n. sp. ATCC 15710.

Inoculum preparation.

Oat meal agar slants seeded with Streptomyces alanosinicus n. sp. were incubated at 20° C for seven to 10 days and then used to inoculate 100 ml. of a peptone-agar-glucose-yeast extract medium contained in 500 ml. Erlenmeyer flask. The composition of this fermination medium is:

| | |
|---|---|
| Meat extract | 5.0 g./liter |
| Peptone | 5.0 g./liter |
| Yeast extract | 5.0 g./liter |
| Enzymatic casein hydrolysate | 3.0 g./liter |
| Cerelose | 2.0 g./liter |
| NaCl | 1.5 g./liter |

The medium is adjusted to pH 7.2 prior to sterilization for 20 minutes at 121° C and 15 lbs steam pressure. The germination flasks are incubated at 28° C for 48 hours on rotary shaker having a 2 inch throw and making 240 rpm.

Fermentation conditions.

A 3percent transfer is made from the germination flask to 500 ml. Erlenmeyer fermentation flaks containing 100 ml. of medium TVF/5 having the following composition

| | g./liter | |
|---|---|---|
| Glucose | 50.0 | |
| Dried whale meat (Pascor) | 10.0 | |
| $CaCO_3$ | 5.0 | |
| $(NH_4)_2SO_4$ | 1.0 | |
| $MgSO_4 \cdot 7H_2O$ | 1.0 | |
| $CuSO_4$ sol. 0.5% | 1 | ml. |
| $FeSO_4$ sol. 0.1% | 1 | ml. |
| $ZnSO_4$ sol. 0.2% | 1 | ml. |
| $MnSO_4$ sol. 0.8% | 1 | ml. |

The medium is adjusted to pH 7.0 prior to sterilization for 20 minutes at 121° C. The fermentation flasks are incubated and agitated under similar conditions as the germination flasks. After 72 hours the mycelium was separated by centrifugation and the untreated broth assayed by the streak dilution method. The results are as follows:

| | Biological activity in dilution units 3 days fermentation. |
|---|---|
| Saccharomyces cerevisae | 1/40 |
| Candida albicans | 1/10 |

EXAMPLE 2.

Jar fermentation of Streptomyces alanosinicus n. sp.
Batch fermentation in 4 liter glass fermentors were performed in the media and operating conditions tabulated below:

Inoculum preparation

First stage - Inoculum source: culture of Streptomyces alanosinicus n. sp. grown on oatmeal agar or a vial of lyophilized spore suspension. Medium and condition of growth identical to those already described in Example 1.

Second stage - Inoculum source: 2.5 percent from the first stage. Medium: same as first stage. The medium, 4 liters in glass fermentor is adjusted to pH 7.2 prior to sterilization for 30 minutes at 121° C, inoculated and incubated at 28° C for 2 hours. During incubation the broth is aerated at the rate of 1 liter air/liter/min. and stirred at 800 rpm.

Fermentation conditions.

Inoculum source: 200 ml. (5percent) from the second inoculum stage. Medium: same as first example (TVF/5). The medium is adjusted to pH 7.0 prior to sterilization for 30 minutes at 121° C. Four liters of this medium containing the inoculum is incubated for 72 to 96 hours at 28° C. During incubation the batch is aerated and agitated as in the first example. The results of the fermentation are given in the following table:

| Fermentations Age/Hours pH | Spectrophotometric titer γ/ml. |
|---|---|
| 0 7.10 | 0 |
| 10 6.85 | 0 |
| 24 6.80 | 120 |
| 34 7.20 | 535 |
| 48 7.20 | 755 |
| 75 7.20 | 865 |
| 82 7.20 | 765 |
| 96 7.20 | 810 |

The extraction and the purification of the product is performed according to the following example.

EXAMPLE 3.

Extraction.

30 liters of broth are centrifuged and 6percent of Darco G-60 charcoal is added to the clear solution, which is stirred for 30 minutes; then the charcoal is filtered off to give an almost colorless solution which is concentrated in vacuo at 45°–50° C to 1.5 liters. The concentrated solution is poured under stirring into 5 liters of methanol, the formed precipitate is filtered, washed with much acetone and dried in vacuo. Yield 230 g. of crude product assaying about 10percent.

Purification.

The above crude product is suspended in 400 ml. of water and to the suspension, cooled to 4° C and kept stirred, sulphuric acid is added to pH 2.0–2.5; the undissolved residue is filtered off, the solution is further diluted with 400 ml. of water and 1.6 liters of methanol are added to precipitate the antibiotic. The mixture is kept at 4° C for some hours to complete precipitation, then it is filtered, washed with acetone and dried in vacuo over $P_2O_5$. Yield 62 g. of a product assaying 27 %. The dried product is suspended in anhydrous methanol and the mixture is kept stirred; perchloric acid (75 %) is added at about 4°C to reach a pH of 3.0, the undissolved portion is filtered off and the antibiotic is precipitated by adjusting the pH 5.5 with sodium methoxide. The suspension is allowed to decant for some hours at 4° C, then it is filtered and the precipitate is washed with diethyl ether. Yield 30 g. (titer 43 percent). An amount of 3.2 of the obtained antibiotic is dissolved in 60 ml. of $H_2O$ and the pH is adjusted to 8; the undissolved portion is filtered off and by the addition of glacial acetic acid, the pH is adjusted to 4–4.5. On cooling at 4° C, 1.2 g. of antibiotic in crystalline form (assaying 75 percent) are obtained. An amount of 2.9 g. of said crystalline antibiotic is dissolved in 900 ml. of water heating the solution to 70°–80° C, then it is filtered, concentrated to 200 ml. and allowed to stand 8–10 hours at 4° C; then it is filtered and washed with cold water. Yield 1.45 g. (assay 97 percent). By further concentrating the solution to 100 ml. a further amount of antibiotic is obtained: 1 g. (assay 80 percent).

EXAMPLE 4.

An amount of 15 grams of the non crystallized antibiotic assaying 34percent, obtained as described in example 3 is suspended in 100 ml. of $H_2O$. The suspension is cooled and concentrated sulphuric acid is added to reach pH 2. The solution is stirred 15 minutes at 4° C, then the precipitated calcium sulphate is filtered off and the solution is adjusted to pH 4.5 by the addition of sodium hydroxide. The suspension is allowed to stand 10–12 hours at 4° C, then filtered and washed with water. Yield 6.5 g. (assay 72 percent). A further purification can be carried out by crystallizing from water as described in the preceding example.

We claim:

1. A process for producing alanosine, which comprises cultivating a microorganism of the class consisting of Streptomyces alanosinicus n. sp. ATCC 15710 in an aqueous nutrient medium containing an assimilable carbon source, an assimilable nitrogen source and mineral salts at a temperature of 20 to 40° C for 1-5 days until substantial antibiotic activity is imparted to said medium, and recovering alanosine from the medium.

2. A compound of the class consisting of alanosine of the formula

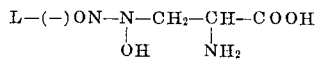

and its salts with alkali metals and alkaline earth metals.

3. A compound of the formula

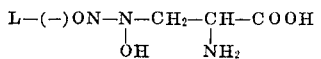

4. The monosodium salt of the compound of claim 3.
5. The disodium salt of the compound of claim 3.
6. The calcium salt of the compound of claim 5.

* * * * *